US012638311B2

(12) United States Patent
Vau et al.

(10) Patent No.: US 12,638,311 B2
(45) Date of Patent: May 26, 2026

(54) METHOD FOR ESTIMATING ANGULAR ERRORS OF ANGLE CODERS IN PRECISION ROTARY DEVICES, DEVICE

(71) Applicant: IXBLUE, Saint-Germain-en-Laye (FR)

(72) Inventors: Bernard Vau, Saint-Germain-en-Laye (FR); Mehdi Bussutil, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 784 days.

(21) Appl. No.: 17/925,286

(22) PCT Filed: May 11, 2021

(86) PCT No.: PCT/EP2021/062492
§ 371 (c)(1),
(2) Date: Nov. 14, 2022

(87) PCT Pub. No.: WO2021/228860
PCT Pub. Date: Nov. 18, 2021

(65) Prior Publication Data
US 2023/0236040 A1     Jul. 27, 2023

(30) Foreign Application Priority Data

May 15, 2020     (FR) ...................................... 2004817

(51) Int. Cl.
*G01D 5/244* (2006.01)
*G01D 5/347* (2006.01)

(52) U.S. Cl.
CPC ....... *G01D 5/2448* (2013.01); *G01D 5/24495* (2013.01); *G01D 5/3473* (2013.01)

(58) Field of Classification Search
CPC ............. G01D 5/2448; G01D 5/24495; G01D 5/3473; G01D 18/001; G01D 5/2449; G05B 2219/37151
See application file for complete search history.

(56) References Cited

U.S. PATENT DOCUMENTS 5,138,564 A * 8/1992 de Jong .............. H03M 1/1047
702/96

OTHER PUBLICATIONS

Kinnane et al., "A simple method for high-precision calibration of long-range errors in an angle encoder using an electronic nulling autocollimator" Mar. 9, 2015, Metrologia 52 244-250, doi: 10.1088/0026-1394/52/2/244 (Year: 2015).*

(Continued)

*Primary Examiner* — Michael J Dalbo
*Assistant Examiner* — Denise R Karavias
(74) *Attorney, Agent, or Firm* — NIXON & VANDERHYE

(57) ABSTRACT

Method for estimating angular errors of coders in a looped system including a rotating actuator, an angle coder producing a position measurements, and a calculation device controlling the actuator, said device receiving a setpoint signal and the position measurements, for looping, and calculating in a corrector a control signal. In a test phase, a specific corrector $C_{\omega_{rj}}(q)$ is synthesised for a constant rotation speed $\omega_{rj}$, the corrector having zero gain at the corresponding frequency and harmonics, resulting in opening the loop, a matrix relation is established between position measurements and a function of parameters characterizing coder errors and torque ripples, the test phase repeats with different rotation speeds, the matrix relations are concatenated producing an identifiable global matrix relation, the parameters are estimated by resolution of the global matrix relation.

19 Claims, 3 Drawing Sheets

(56) References Cited

OTHER PUBLICATIONS

Vau et al., "An improved control structure for the tracking of sine command in a motion simulator" Jun. 21, 2019, Modeling Aspects in Optical Metrology VII, vol. 11057, https://doi.org/10.1117/12.2530038 (Year: 2019).*

Wang et al., "Study on self-calibration angle encoder using simulation method" Jan. 26, 2016, Proceedings vol. 9903, Seventh International Symposium on Precision Mechanical Measurements; 990320 (2016) https://doi.org/10.1117/12.2217638 (Year: 2016).*

Lu et al., "On-axis self-calibration of angle encoders" 2010, CIRP Annals-Manufacturing Technology, https://doi.org/10.1016/j.cirp.2010.03.127 (Year: 2010).*

Hua-Kun Jia et al., "A New Method of Angle Measurement Error Analysis of Rotary Encoders," Aug. 19, 2019, applied sciences MDPI, downloaded from https://doi.org/10.3390/app9163415 (Year: 2019).*

International Search Report for PCT/EP2021/062492, dated Jul. 26, 2021, 6 pages.

Lu X D et al., "On-axis self-calibration of angle encoders", Cirp Annals, Elsevier BV, NL, CH, FR, vol. 59, No. 1, Jan. 1, 2010, pp. 529-534. (to follow).

Wang Yan et al., "Study on self-calibration angle encoder using simulation method", vol. 9903, Biomedical Photonics and Optoelectronic Imaging: Nov. 8-10, 2000, Jan. 26, 2016, pp. 990320-990320. (to follow).

Vau Bernard et al., "An improved control structure for the tracking of sine command in a motion simulator", vol. 11057 Proceedings of SPIE, Jun. 21, 2019, pp. 110570U-110570U. (to follow).

Lu et al., "On-axis self-calibration of angle encoders", CIRP Annals—Manufacturing Technology, Elsevier BV, NL, CH, FR, vol. 59, No. 1, Jan. 1, 2010, pp. 529-534.

Wang et al., "Study on self-calibration angle encoder using simulation method", Biomedical Photonics and Optoelectronic Imaging: Nov. 8-10, 2000, Proc. of SPIE, International Society for Optical Engineering, Jan. 26, 2016, vol. 9903, pp. 990320-1-990320-7.

Vau et al., "An Improved Control Structure for the Tracking of Sine Command in a Motion Simulator", Proceedings of SPIE, Jun. 21, 2019, vol. 11057 , pp. 110570U-1-110570U-12.

* cited by examiner

[Fig. 1]
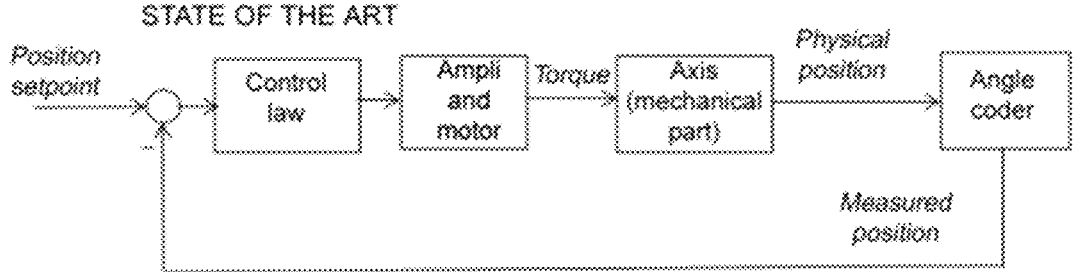
[Fig.2]
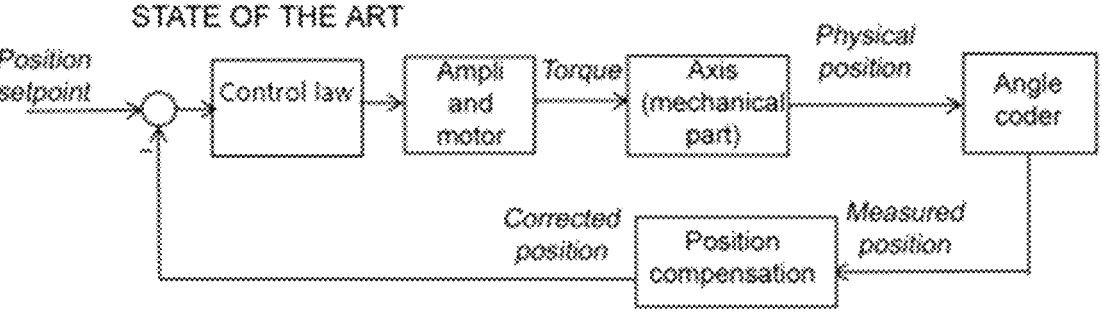
[Fig. 3]
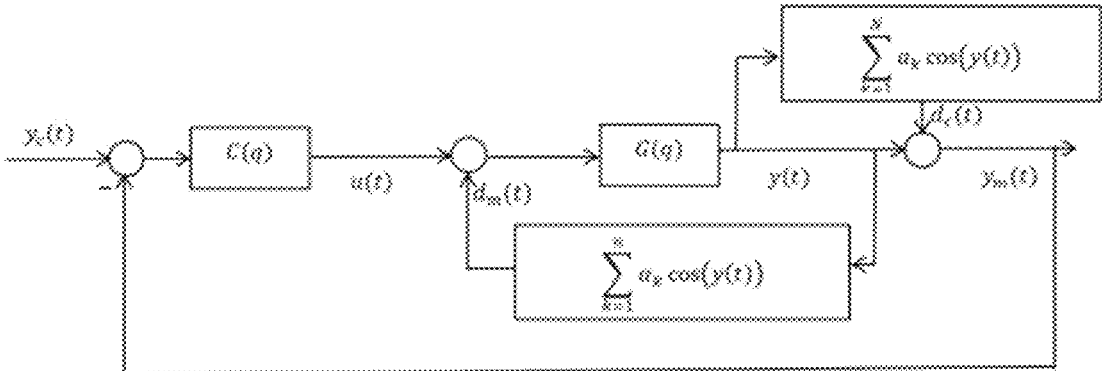

[Fig. 4]
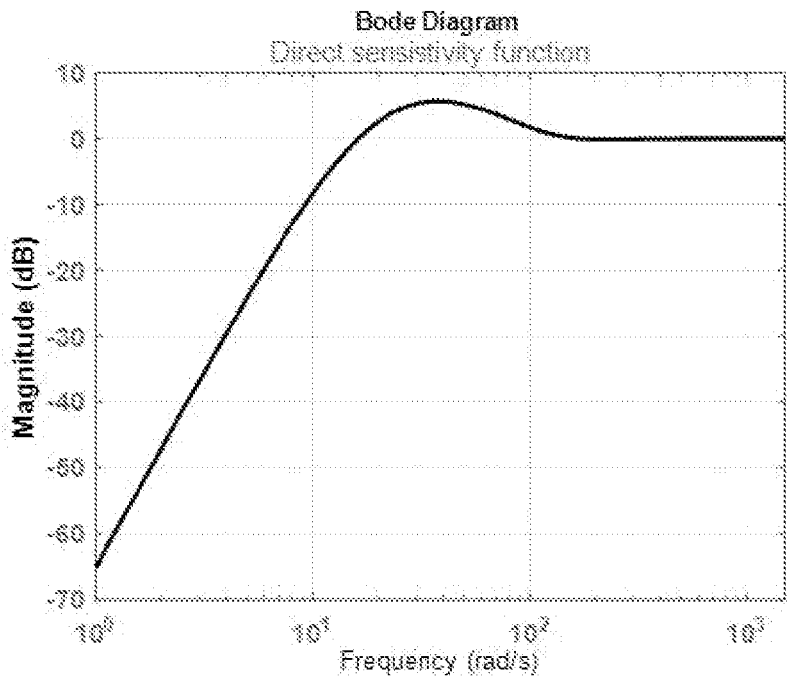

[Fig. 5]
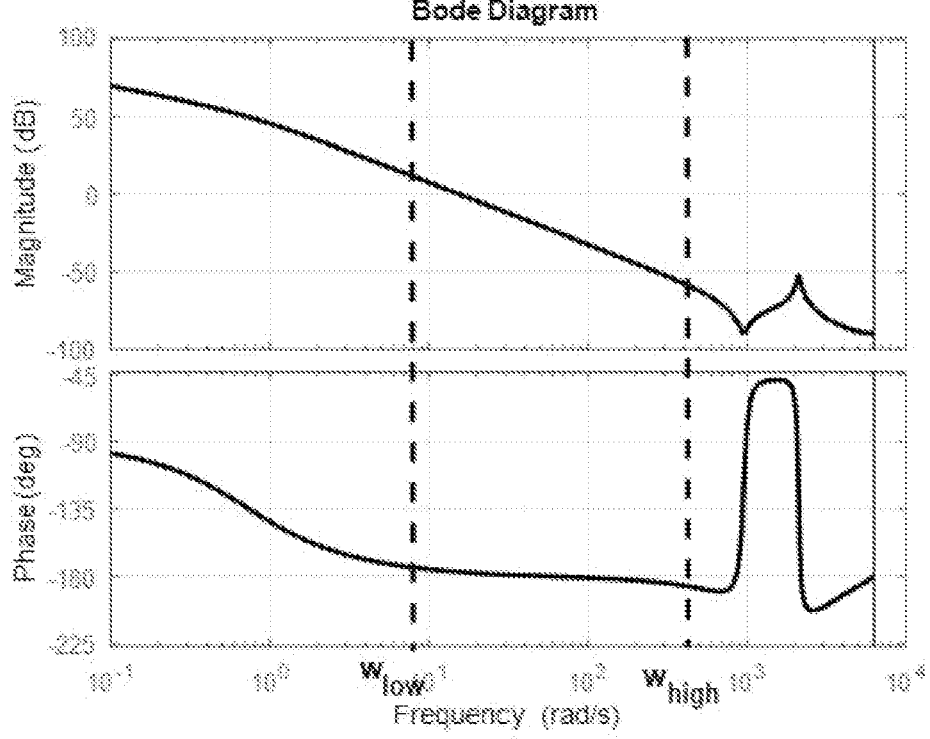
[Fig. 6]
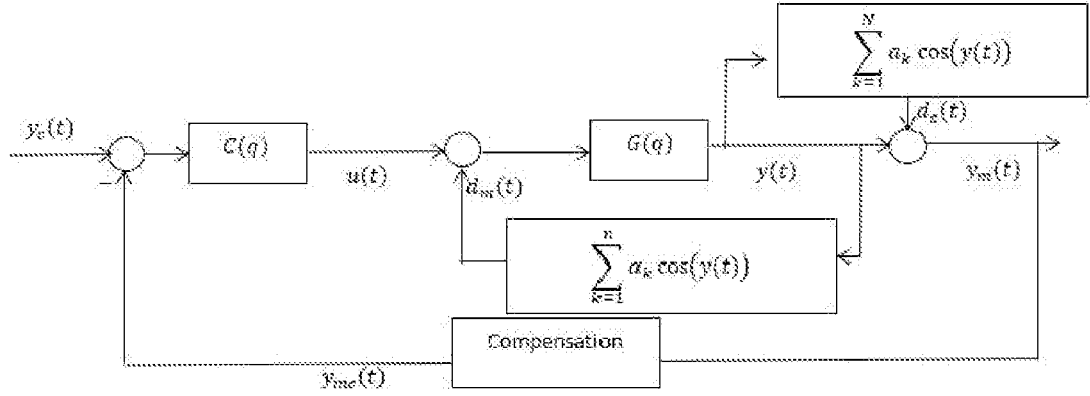

METHOD FOR ESTIMATING ANGULAR ERRORS OF ANGLE CODERS IN PRECISION ROTARY DEVICES, DEVICE

CROSS-REFERENCE TO RELATED APPLICATIONS

This application is the U.S. national phase of International Application No. PCT/EP2021/062492 filed May 11, 2021 which designated the U.S. and claims priority to FR 2004817 filed May 15, 2020, the entire contents of each of which are hereby incorporated by reference.

BACKGROUND OF THE INVENTION

Field of the Invention

The present invention generally relates to the field of precision servo equipment comprising controlled rotation actuators, in particular motion simulators and centrifuges. It more particularly relates to a method for estimating angular errors of angle coders in precision rotary devices as well as a device comprising means for implementing the method.

Description of the Related Art

Motion simulators are known, which are high-precision devices intended to subject in particular components or inertial systems to perfectly controlled movements in order to test them.

Motion simulators may be single- or multi-axes and each axis is driven by one or more motors, most often electric motors, and whose angular position is controlled by means of a closed-loop control device. The control algorithm generally generates a current command proportional to a torque command, which is a setpoint for the power electronic stage associated to the motor. This control algorithm receives a setpoint that may be a position, and/or a speed and/or an angular acceleration of the axis to be controlled and also uses, directly or indirectly, a measurement of angular position of the controlled axis. This angular position fed back to the control is generally measured by an angle coder. These coders may be optical or inductive or capacitive or magnetic coders.

The typical block-diagram of the control loop corresponding to an axis of a motion simulator is shown in FIG. 1. Variants are possible as regards the control law: the control law may be provided with a "feedforward" action, making the setpoint act directly on the control, possibly through a filter. Likewise, in addition to the position setpoint, there may be speed and acceleration setpoints in the structure. In alternative embodiments, the angular position measured is derived before arriving to the corrector, the setpoint being then a speed setpoint possibly associated with an acceleration setpoint. The structure of the closed loop for controlling a centrifuge axis is the same, with also the same possible alternative embodiments.

For various reasons, the angular position measurements provided by these coders are necessarily subject to errors. These errors may be of random nature, due to noises in the signal processing devices of the system, but a significant part of the measurement errors is of deterministic nature. When the error is deterministic, this error between the real position of the axis and the measurement provided by the coder is repeatable for each position of the axis.

Currently, the measurement errors of the angular coders are the predominant source of error of the controlled position of the machine.

In the state of the art, these deterministic angular errors of the position coder of the machine are evaluated by means of an optical device external to the simulator, consisted of an interferometer that receive the beams from a laser source reflected by a polygonal mirror attached to the axis of the motion simulator. The angles between the sides of the polygonal mirror are known with a great accuracy by a previous calibration. Evaluating the angular deviations of the beams reflected by each side of the mirror when the machine axis is controlled to a known setpoint position makes it possible to estimate with an accuracy generally lower than one second of arc the angular errors of the coder, for a setpoint position of the axis. The number of sides of the polygonal mirror being reduced, most often 8 sides, the number of positions of the machine axis for which we have the coder error is thus limited. These measurements nevertheless allow establishing correction tables on a complete rotation by interpolation of the known coder errors on this limited number of positions. Nevertheless, this interpolation does not allow ensuring a sufficiently accurate position correction as generally required for testing inertial systems at positions for which an optical measurement is not possible.

In any case, when a table of the coder angular errors has been established by the above evaluation, it is possible to introduce into the control loop a compensation table whose compensation is the opposite of the estimated coder error, this compensation table being inserted downstream from the raw measurement provided by the coder, in order to provide the control with a compensated angular position. Such a control loop is shown in FIG. 2.

In order to have an accurate estimation of the coder error on the $2\pi$ radians of the axis, certain "autonomous" methods, i.e. without the use of an optical method, for determining the coder error have been developed for rotary axes. In particular, mention can be made to the method developed in the article "On-axis self-calibration of angle encoders" whose authors are X. D. Lu, R. Graetz, D. Amin-Shahidi, and K. Smeds, in CIRP annals, vol. 59 (2010). The matter is here to observe the signal provided by the coder when the axis is in deceleration, the control being deactivated, at a relatively high speed over an angular range of generally 47 radians. The undulations of the angular position around a quasi-continuous component of the position (generally modelled by an arc of parabola on this range) give information about the measurement errors of the coders.

This method, whose principle is simple, has for advantage to provide an estimation of deterministic error of the coder over 360°.

However, it can be observed that the tests carried out by the authors mentioned above require making the test when the control is deactivated, and implement a rotary device consisted of an air bearing, so as to minimise the friction as much as possible. Now, if the friction effects are generally represented by deterministic models (many of them exist, Coulomb, Dahl, Lugre . . . ) as a function of the speed, the fact remains that these frictions result from a very great number of phenomena at atomic scale, which means that in practice, these frictions have, in part, a random behaviour when the axis of the simulator operates at a given speed.

Now, the motion simulators and centrifuges are generally equipped with ball bearing, and the effective random disturbances due to the real frictions are thus far more significant than in the experience of the above-mentioned article.

For that reason, the method presented in this article is not transposable to the case of motion simulators because, due to the random disturbances resulting from the frictions, it would lead to estimations of the coder errors subject to uncertainties of such a level that these estimations would not be usable.

In order to reduce the uncertainties, it could be imagined to use the above method with an increased number of rotations on which the estimation is made due to the fact that having more information makes it possible to mitigate the uncertainties on the estimates. However, we then come up against the fact that the test is made in deceleration phase and, above all, without control, i.e. in open loop, and the user has thus no control on the test duration. In practice, the user won't have a sufficient duration of deceleration to obtain a good accuracy of the estimates.

It would be desirable to have at disposal a method for estimating the coder errors where the measurements during the test phase could last as long as desired, in order to obtain a high enough quantity of acquired information, making it possible to significantly reduce the estimation uncertainties.

That is what proposes the method of the invention in which the system is stimulated/excited and position measurements are made to estimate the errors of the coders on the system that is and remains in closed loop, just as it is in the subsequent phase of use of the system, that is to say when the position control is active in such a way as not to be constraint by the natural deceleration of the axis.

However, making these measurements to estimate the errors of the coders on a closed-loop system causes certain specific difficulties that are explained in the detailed disclosure part of the invention and that are overcome by the invention.

The following documents are also known: U.S. Pat. No. 5,138,564 A; by WANG YAN ET AL: "Study on self-calibration angle encoder using simulation method", BIO-MEDICAL PHOTONICS AND OPTOELECTRONIC IMAGING (SOCIETY FOR OPTICAL ENGINEERING) vol. 9903, ISBN: 978-1-62841-832-3; and by VAU BERNARD ET AL: "An improved control structure for the tracking of sine command in a motion simulator", PROCEEDINGS OF SPIE; vol. 11057, ISBN: 978-1-5106-3927-0.

SUMMARY OF THE INVENTION

In order to remedy the above-mentioned drawbacks, the present invention proposes a method for estimating angular errors of angle coders for a looped/controlled system including at least one actuator for rotating an axis and an angle coder producing a signal of position measurement of said axis, and including a calculation device for at least controlling said actuator, the calculation device receiving, on the one hand, a setpoint signal at the system input, in particular a position setpoint signal $y_c(t)$ and, on the other hand, the measurement signal, for looping/controlling the system, the rotation actuator generating torque undulations $d_m(t)$, the coder producing coder errors $d_c(t)$ which, for a setpoint signal $y_c(t)$ that corresponds to a rotation of the axis at a speed $\omega_r$ supposed to be constant, have a spectrum consisted of the fundamental rotation frequency $\omega_r$ and its harmonics $k\theta_r$, $k \in \mathbb{N}$, the calculation device calculating a command signal in a corrector, wherein, in a test phase, for a speed of rotation indexed j, $\omega_{rj}$, supposed to be constant, a specific corrector $C_{\omega_{rj}}(q)$ of said constant speed of rotation $\omega_{rj}$ is synthetized, said corrector $C_{\omega_{rj}}(q)$ being such that, for the frequency domain comprising the fundamental frequency or; and a determined number of its first harmonics $k\omega_{rj}$, $k \in \mathbb{N}$, $1 < k \leq N_l$, the corrector having a substantially zero gain at theses frequencies $\omega_{rj}$, $k\omega_{rj}$, which causes an opening of the loop at said frequencies, and a matrix relationship is established between the position measurements and a function of parameters characterizing the coder errors and the torque undulations, on the system with the specific corrector and at the constant speed of rotation $\omega_{rj}$, the test phase is repeated a determined number n of times with different setpoints of rotation at speed or; supposed constant, where $j \in \mathbb{N}$, $1 < j \leq n$, the matrix relationships are concatenated in order to obtain an identifiable global matrix relationship, the parameters characterizing the coder errors and the torque undulations are estimated by solving the global matrix relationship.

The term "supposed" qualifying the speed in the definition of the setpoint signal $y_c(t)$ is used to mean that a setpoint is used, in particular a ramp for a position setpoint, which, in the absence of any defect in the system, would give a constant measurement of speed of rotation of the axis but which actually gives a speed measurement that is disturbed, in particular, by the coder errors and the torque undulations, and that it is not searched here to send a setpoint countering these errors and torque undulations.

Other non-limiting and advantageous features of the method according to the invention, taken individually or according to all the technically possible combinations, are the following:

the speed of rotation of the axis is expressed in rad/s, moreover, once estimated the parameters characterizing the coder errors and the torque undulations, the calculation device is configured for the execution in real time of the calculation of a coder error compensation signal in order to compensate for the coder errors, the calculation device is moreover configured to take into account the torque undulations in real time and to correct them, the calculation of the coder error compensation signal is performed in a compensation calculation block of the calculation device, a range $[\omega_{low}, \omega_{high}]$ of rotation frequency of the actuator in which the axis transfer function module has a decrease of substantially 40 dB/decade is previously determined, in the test phases, the different rotation speeds $\omega_{rj}$ are further chosen in such a way that each constant rotation speed $\omega_{rj}$ and its $N_l$ harmonics $k\omega_{rj}$ are in the range $[\omega_{low}, \omega_{high}]$, the range $[\omega_{low}, \omega_{high}]$ of rotation frequency of the actuator in which the axis transfer function module has a decrease of substantially 40 dB/decade is determined by a method chosen among:

a graphical method using the curve of the gain $$G(e^{i\omega}) = \left| \frac{B(e^{i\omega})}{A(e^{i\omega})} \right|$$

of the axis transfer function and wherein a lower limit $\omega_{low}$ and an upper limit $\omega_{high}$ of frequencies surrounding an area of the curve having a decrease of substantially 40 dB/decade are determined, an identification method, in particular parametric, in the test phase, the setpoint at the system input is a ramp position setpoint signal $y_c(t)$, or a constant speed setpoint signal, in the test phase, the ramp position setpoint signal $y_c(t)$ increases over time, in the test phase, the ramp position setpoint signal $y_c(t)$ decreases over time, the number $N_l$ of harmonics $k\omega_{rj}$ is identical for the n tests with rotation setpoints at different speeds $\omega_{rj}$, the corrector is synthetized either by a mixed-sensitivity method on a H-infinity control, or by a robust pole placement method on RST corrector, the matrix relationship between the position measurements and a function of parameters characterizing the coder errors and the torque undulations is expressed by:

$$Y_j = \phi_j \theta + D_j$$

$$\text{with } \phi_j = \begin{bmatrix} \varphi(0) \\ \varphi(1) \\ \vdots \\ \varphi(t_f) \end{bmatrix} \quad Y_j = \begin{bmatrix} y'_m(0) \\ y'_m(1) \\ \vdots \\ y'_m(t_f) \end{bmatrix}$$

where $Y_j$ is a vector of centred position measurements of coefficients $$y'_m(t),$$

and $$\varphi(t) = \left[ \cos(y_m(t)) \quad \sin(y_m(t)) \quad \cos(2y_m(t)) \quad \sin(2y_m(t)) \quad \ldots \quad \frac{1}{(\omega_r)^2}\cos(y_m(t)) \quad \ldots \quad \frac{1}{(\omega_r)^2}\sin(y_m(t)) \quad \frac{1}{(2\omega_r)^2}\cos(2y_m(t)) \quad \frac{1}{(2\omega_r)^2}\sin(2y_m(t)) \ldots \right] \text{ and}$$

$$\theta^T = [\, a_1 \quad b_1 \quad a_2 \quad b_2 \quad \ldots \quad \alpha'_1 \quad \beta'_1 \quad \alpha'_2 \quad \beta'_2 \quad \ldots \,]$$

a transposed vector of the parameters characterizing the coder errors and the torque undulations, and $D_j$ a vector of centred disturbance terms, the vector $Y_j$ is a column vector, the identifiable global matrix relationship $Y=\phi\theta+D$ with:

$$Y = \begin{bmatrix} Y_1 \\ Y_2 \\ \vdots \\ Y_n \end{bmatrix} \quad \phi = \begin{bmatrix} \phi_1 \\ \phi_2 \\ \vdots \\ \phi_n \end{bmatrix}$$

is used to produce an estimation a of the parameters characterizing the coder errors and the torque undulations by linear regression and application of a least squares relationship according to $\hat{\theta}=(\phi^T\phi)^{-1}\phi^T Y$, the estimation $\hat{\theta}$ of the vector $\theta$ of the parameters characterizing the coder errors and the torque undulations is calculated by iteration, the estimation $\hat{\theta}$ of the vector $\theta$ of the parameters characterizing the coder errors and the torque undulations is calculated by iteration: after a first repetition of test phases and a first calculation of the parameters characterizing the coder errors and the torque undulations by solving the global matrix relationship, a first estimated vector $\hat{\theta}_1$ is estimated, the coder error compensation signal being then calculated and the torque undulations being then taken into account on the basis of said first estimated vector $\hat{\theta}_1$, a new repetition of test phases and a new calculation of the parameters characterizing the coder errors and the torque undulations by solving the global matrix relationship are performed on the system so-compensated on the basis of said first estimated vector $\hat{\theta}_1$, a new estimated vector $\hat{\theta}_2$ being estimated, the coder error compensation signal being then calculated and the torque undulations being then taken into account on the basis of the sum of the previous estimated vector $\hat{\theta}_1$ and the new estimated vector $\hat{\theta}_2$, and subsequent iterations are performed on the compensated system on the basis of the sum of the previous estimated vectors $\hat{\theta}_1+\hat{\theta}_2+\hat{\theta}_3 \ldots$ .

in the case where an estimation $\hat{\theta}$ of the vector $\theta$ of the parameters characterizing the coder errors and the torque undulations is calculated by iteration, an iteration stop criterion is set, the identifiable global matrix relationship $Y=\phi\theta+D$ with:

$$y = \begin{bmatrix} Y_1 \\ Y_2 \\ \vdots \\ Y_n \end{bmatrix} \quad \phi = \begin{bmatrix} \phi_1 \\ \phi_2 \\ \vdots \\ \phi_n \end{bmatrix}$$

is used to produce an estimation a of the parameters characterizing the coder errors and the torque undulations and with a regularization method using the following relationship:

$$\hat{\theta} = \left(\phi^T\phi + H\right)^{-1}\phi^T Y$$

where H is a square matrix defined positive of the size of $\phi^T\phi$, an interferometric optical measurement method is implemented for measuring the coder position errors, said measurements being made on a finite number $n_p$ of positions of the axis, and the estimation $\hat{\theta}$ of the parameters characterizing the coder errors and the torque undulations is obtained by minimizing a quadratic criterion $J=(Y-\phi\theta)^T(Y-\phi\theta)$ under the equality constraint $E_c=C\theta$, where C is a matrix such that $$C = \begin{bmatrix} \cos(y_1^*) & \sin(y_1^*) & \ldots & \cos(Ny_1^*) & \sin(Ny_1^*) & 0_{1,N_l} \\ \vdots & \vdots & \vdots & \vdots & \vdots & \vdots \\ \cos(y_{n_p}^*) & \sin(y_{n_p}^*) & \ldots & \cos(Ny_{n_p}^*) & \sin(Ny_{n_p}^*) & 0_{1,N_l} \end{bmatrix}$$

$$y_i^*$$

corresponding to the $n_p$ measurement positions on the axis, $i \in [1, \ldots n_p]$, and N is the maximum harmonic rank of a Fourier series decomposition of the coder errors, certain harmonics $k\omega_{rj}$ are omitted for the estimation of the parameters characterizing the coder errors and the torque undulations, the omitted harmonics $k\omega_{rj}$ are intermediate harmonics, all the harmonics $k\omega_{rj}$ are used for the estimation of the parameters characterizing the coder errors and the torque undulations, the determination by identification of the axis transfer function is performed on the looped system, the determination by identification of the axis transfer function is performed on the system that is placed in a non-looped configuration.

The invention also proposes a device having at least one rotary axis, said device being a motion simulator or a centrifuge and including a looped/controlled system including at least one actuator for rotating the axis and an angle coder producing a position measurement signal of said axis, and including a calculation device for at least controlling said actuator, the calculation device receiving, on the one hand, a setpoint signal at the system input, in particular a position setpoint signal $y_c(t)$ and, on the other hand, a measurement signal, for looping/controlling the system, the rotation actuator generating torque undulations $d_m(t)$, the coder producing coder errors $d_c(t)$ which, for a setpoint signal $y_c(t)$ that corresponds to a rotation of the axis at a speed supposed to be constant $\omega_r$, have a spectrum consisted of the fundamental rotation frequency $\omega_r$ and its harmonics $k\omega_r$, $k \in \mathbb{N}$, the calculation device further calculating a command signal in a corrector, the calculation device being configured to execute the method of the invention in order to estimate parameters characterizing the coder errors and the torque undulations.

Preferably, in the device, the calculation device is moreover configured, once estimated the parameters characterizing the coder errors and the torque undulations, to allow the real time calculation, in a compensation calculation block, of a coder error compensation signal in order to compensate for the coder errors according to the method of the invention.

BRIEF DESCRIPTION OF THE DRAWINGS

The following description in relation with the appended drawings, given by way of non-limiting examples, will allow a good understanding of what the invention consists of and of how it can be implemented.

In the appended drawings:

FIG. 1 shows as a block-diagram a state-of-the-art closed-loop system for controlling an axis of a state-of-the-art motion simulator, FIG. 2 shows the state-of-the-art system of FIG. 1, but including in addition a state-of-the-art position compensation block for compensating for the angular coder errors, FIG. 3 shows as a block-diagram a closed-loop/controlled system of a motion simulator axis, making it possible to visualize the sources of spatially periodic disturbances of the sensor (coder error) and of the actuator (typically: torque undulations/"cogging"), which is generally an electric motor, FIG. 4 shows the curve of the module of the direct sensitivity function according to the Bode representation for a typical closed-loop/controlled system of a motion simulator axis, FIG. 5 shows a typical example of amplitude and phase Bode diagram of the transfer function of the rotary axis, FIG. 6 shows as a block-diagram the closed-loop/controlled system of a motion simulator axis, with a compensation calculation block obtained by the method of the invention.

DESCRIPTION OF THE PREFERRED EMBODIMENTS

The specific difficulties met and the way they have been solved in practice, as well as the different ways to implement the proposed solution will now be described, which will allow a good understanding of the invention.

The controlled axis is driven in rotation by an actuator, typically a motor, and is subjected to two types of spatially periodic disturbances:

The disturbances linked to the defects of the motor, and which are commonly called "cogging" or torque undulations, are disturbances depending on the position of the axis.

The disturbances linked to the measurement errors of the angular coder, which are also spatially periodic and which are those that are desired to be estimated.

To these spatially periodic disturbances are added various disturbances, for example disturbances linked to the frictions that have a deterministic component and a random component.

As regards the angle coder:

Let $y(t)$ be the physical position of the axis at instant t and $y_m(t)$ the measured position as provided by the angle coder. The coder errors act additively on the position $y(t)$, and are spatially periodic, hence decomposable into Fourier series, so that it can be written:

$$y_m(t) = y(t) + \sum\nolimits_{k=1}^{N}[a_k\cos(y(t)) + b_k\sin(y(t))] \tag{1}$$

In this formula, abstraction is made of the random disturbances, that is to say they are not characterized.

It is supposed that the maximum harmonic rank denoted N is finished, which corresponds in practice to the fact that the harmonics of higher and higher rank have a weaker and weaker disturbing effect and may be neglected. The $a_k, b_k$ characterizing the coder errors are terms of a Fourier series and are real scalar values.

As regards the axis rotation actuator, typically a motor:

Let $u(t)$ be the motor torque, supposed to be non-subjected to disturbances, as coming from the control, and $u_e(t)$ the effective/real torque acting on the axis. If only spatially periodic torque disturbances are considered, then the relationship between $u(t)$ and $u_e(t)$ is given by:

$$u_e(t) = u(t) + \sum\nolimits_{k=1}^{N}[a_k\cos(y(t)) + \beta_k\sin(y(t))] \tag{2}$$

This relationship is valid if the proper dynamics of the current control loops managed by the motor amplifier are neglected, which is justified by the high bandwidth of these current loops with respect to the frequencies of the motor disturbances and the motor errors involved here.

From this equation (2), it is also possible to model an unbalance torque, which is also sinusoidal over $2\pi$ radians, i.e. for k=1. The block-diagram of the disturbed closed loop is shown in FIG. 3 in which the parameters are the following:

- $y_c(t)$: position setpoint,
- $y(t)$: physical/real position (non accessible),
- $y_m(t)$: position measured by the coder,
- $d_c(t)$: coder error,
- $d_m(t)$: torque undulations or "cogging",
- $u(t)$: torque command signal provided by the corrector and that corresponds to the motor torque by supposing it non subjected to disturbances and as coming from the control,
- $u_e(t)$: effective/real torque, this torque being disturbed by the torque undulations or "cogging",
- $G(q)$: operator of the axis transfer function,
- $C(q)$: operator of the corrector transfer function,
- $q$: advance operator of a sampling period, the method implementing a sampled system of the measurements and the calculations, the calculations being performed by a typically programmable calculator, in particular of the microprocessor type. The corrector and axis transfer functions are hence represented in discrete time.

The relationship between $d_c(t)$, $d_m(t)$ and $y_m(t)$ is given by the following relationship:

$$y_m(t) = \frac{1}{1 + C(q)G(q)} d_c(t) + \frac{G(q)}{1 + C(q)G(q)} d_m(t) + \bar{y}(t) \tag{3}$$

where $\bar{y}(t)$ would be the physical position of the axis non subjected to torque disturbances.

In this relationship (3), $d_c(t)$ depends on $y(t)$ and $d_m(t)$ depends indirectly on $y(t)$. Based on this relationship (3), it is observed that when the corrector is active, the effect of $d_c(t)$ on $y_m(t)$ acts via the direct sensitivity function:

$$S_{y_m d_c}(q) = \frac{1}{1 + C(q)G(q)}, \tag{}$$

and
the effect of $d_m(t)$ on $y_m(t)$ acts via the sensitivity function:

$$S_{y_m d_m}(q) = \frac{G(q)}{1 + C(q)G(q)}.$$

The effect of the coder errors on the position provided by said coder is indirect in closed loop, because it depends on the direct sensitivity function $S_{y_m d_c}(q)$. Thus, applying the method of the article Lu et al. (2010) could only lead to a strongly erroneous (biased) estimation, even in case of low random disturbances. So, it is necessary to develop a method for estimating the coder errors that take into account the specificity of the closed-loop operation of the system.

Now, if the corrector transfer function is generally known with certainty, the axis transfer function $G(q)$ is, to a certain extent, uncertain. As a first approximation, this function results from the second Newton law, and that way, in a significantly wide frequency range, it is noted that the gain of $G(q)$ decreases by 40 dB/decade, which is the hallmark of a dual integrator.

Nevertheless, this property of decrease by 40 dB/decade is not verified at low frequency, where the gain decrease tends asymptomatically to 20 dB/decade due to the viscous frictions, nor at high frequency, where structure resonances and anti-resonances appear.

As $G(q)$ is not known with certainty, it is the same for $S_{y_m d_c}(q)$. Thus, any estimation of $d_c(t)$ based on $y_m(t)$, using a theoretical expression of $S_{y_m d_c}(q)$ might be source of estimation errors. It is therefore necessary that, at the frequencies at which occur the effects of $d_c(t)$, the direct sensitivity function $S_{y_m d_c}(q)$ has a gain and a phase that are known with certainty, and that despite the uncertainties on $G(q)$, which causes specific difficulties and requires the implementation of a new corrector synthesis method that is specific to the use of the closed-loop system for estimating the angle coder error.

By way of example, FIG. 4 shows the typical module that the direct sensitivity function $S_{y_m d_c}$ may have as a function of the speed or frequency of rotation (these deux terms being considered equivalent) in rad/s. It can be seen that its module is equal to 0 dB only at high frequency. For lower frequencies, the gain of the direct sensitivity function is different from 1, and hence, at these lower frequencies, this sensitivity function causes bias on the estimation of $d_c(t)$ if the estimation method described in the above-mentioned article of X. D. Lu et al. (2010) is used.

The method for estimating the angle coder errors on a closed-loop/controlled system as proposed by the invention will now be described.

For these explanations, it is supposed that the corrector implemented is of the RST type. However, in other embodiments, other types of correctors can be used, all the more so since the RST corrector is the most general form of single-variable corrector, and all the other corrector structures can come down thereto.

In case of equipment with several axes, each axis implements its own method according to the invention.

For this generic RST corrector structure, the command obtained by $C(q)$ is written:

$$u(t) = -\frac{R(q)}{S(q)} y_m(t) + \frac{T(q)}{S(q)} y_c(t) \tag{4}$$

In FIG. 3, which is a particular case of implementation, implicitly $T(q)=R(q)$. The parameters $R(q)$, $S(q)$, $T(q)$ are polynomials in $q$, $S(q)$ being a monic polynomial. The transfer operator representing the real system is expressed as a fraction of two polynomials $B(q^{-1})$ and $A(q^{-1})$, the latter polynomial being monic, such that:

$$G(q) = \frac{B(q)}{A(q)} \tag{5}$$

The proposed method for characterizing $d_c$ (coder error) consists in performing tests on the system that is and remains physically in closed loop. It is reminded that the system includes calculation and control means, the rotation actuator and a sensor, and that it receives a setpoint that is here a position setpoint to simplify the explanations but it could receive one/several setpoints of other types, position and/or speed and/or acceleration.

During these tests, a position setpoint is applied, which is such that it amounts to require that the axis rotates at constant speed. It is reminded that the speed is the derivative of the position and this means that the position setpoint imposed to the system is a ramp.

Under these conditions of ramp-shaped position setpoint, the coder errors appear as temporally quasi-periodic disturbances due to the obtained speed of the axis that is quasi-constant and to the periodicity of the disturbance coming from the angle coder errors.

It is supposed that the system and its control law have together systematically at least two integrators, which makes it possible to follow the speed setpoint without lagging error according to the final value theorem.

Let's note $\omega_r$ the speed of rotation of the axis (in rad/s), we have then:

$$y_m(t) = \omega_r t + y(0) + d(t) \qquad (6)$$

where d(t) is the whole disturbances of the axis brought back to y(t) and with d(t) which has a zero mean.

Under those conditions, it may be written:

$$d_c(t) \approx \sum_{k=1}^{N} [a_k \cos(y(t)) + b_k \sin(y(t))] + d'(t) \qquad (7)$$

where d'(t) is a zero-mean term that will be neglected in the following.

It is observed that, based on the shape of the typical direct sensitivity function curve shown in FIG. 4, that $$\left| \frac{1}{1 + C(e^{i\omega})G(e^{i\omega})} \right|$$

tends to 1 in high frequency if the gain of the open-loop system is close enough to 0, which requires a significant "roll-off" of the high-frequency corrector.

It is deduced therefrom that for high enough values of $k\omega_r$, the direct sensitivity function has for module $$\left| \frac{1}{1 + C(e^{i\omega})G(e^{i\omega})} \right|_{k\omega_r} \approx 1,$$

and the "closed-loop" effect is then negligible at these high frequencies and, at these frequencies, it is as if the loop were open whereas it is physically closed.

However, it is not the same for the harmonics of low ranks in formula (7), hence for lower frequencies that do not allow this "loop opening" and that are those which are desired to be estimated in priority due to the fact that they are dominant as regards their power.

Also, to robustly avoid the effect of the direct sensitivity function $S_{y_m d_c}$, it is proposed to synthesize for each speed of rotation $\omega_r$ a specific corrector denoted $$C_{\omega_r}(q) = \frac{R_{\omega_r}(q)}{S_{\omega_r}(q)},$$

which is such that it "opens the loop" locally in the frequency domain at the fundamental frequency $\omega_r$ and its first harmonics $k\omega_r$, $k\in \mathbb{N}$, $1 < k \leq N_l$, $N_l$ being the maximum rank of the harmonics that are desired to be estimated. This maximum rank $N_l$ corresponds in practice to the first harmonics contributing to a non-negligeable level of error and that, as will be seen, will be such that the harmonic of maximum rank, $N_l\omega_r$, is lower than or equal to a maximum frequency $\omega_{high}$.

If $C_{\omega_r}(q)$ opens the loop at the frequencies $\omega_r$, $2\omega_r$, . . . $N_l\omega_r$, then by definition $$\left| C_{\omega_r}(e^{j\omega}) \right|_{\substack{\omega=k\omega_r \\ 1\leq k \leq N_l}} = 0$$

and, therefore, we have robustly for the direct sensitivity function module, $$\left| \frac{1}{1 + C(e^{i\omega})G(e^{i\omega})} \right|_{\substack{\omega=k\omega_r \\ 1\leq k \leq N_l}} = 1.$$

Under these conditions, the frequency components of $d_c(t)$ (coder error) of frequencies $\omega = k\omega_r$, $1\leq k \leq N_l$ have a direct effect on $y_m(t)$, without being affected by the direct sensitivity function.

Also, for a test performed at a known constant setpoint speed or, a corrector having a gain with notches at the frequencies $k\omega_r$ could be implemented.

However, contrary to what could be thought at first sight, it is not sufficient to add notch filters at the frequencies multiple of $\omega_r$: Indeed, forcing a zero gain of the corrector at a given frequency amounts, as seen hereinabove, to force the direct sensitivity function $S_{y_m d_c}$ to have a gain equal to 1 at these frequencies. Now, it is well known that the direct sensitivity function module $$\left| S_{y_m d_c}(e^{i\omega}) \right| = \left| \frac{1}{1 + C(e^{i\omega})G(e^{i\omega})} \right|$$

is subjected to a conservation principle issuing from the Bode theorem that, in the case where the open loop has no instable pole, is written:

$$\int_{-\frac{\pi}{T_e}}^{+\frac{\pi}{T_e}} \log \left| \frac{1}{1 + C(e^{i\omega})G(e^{i\omega})} \right| d\omega = 0 \qquad (8)$$

Therefore, with such a filtering, the forcing of $$\left| \frac{1}{1 + C(e^{i\omega})G(e^{i\omega})} \right|$$

to 1 at a given frequency causes an alteration of this direct sensitivity function at other frequencies, and in particular it may lead to an increase, which may be inacceptable for the robustness of the closed loop, of this direct sensitivity function module, by reducing in particular the module margin. It is reminded that the module margin is the inverse of the maximum of $|S_{y_m d_c}(e^{j\omega})|$.

For that reason, it is necessary to implement another corrector synthesis method to allow "opening the loop" at the frequencies $k\omega_r$ that have an interest for characterizing the coder error $d_c(t)$, while keeping good robustness in terms of static and dynamic margins. Several corrector synthesis methods exist, which may be used to obtain this result.

A method adapted to H-infinity control, by application of the so-called mixed sensitivity method that consists in imposing templates in the frequency domain to the gains of the various sensitivity functions of the loop, the synthesis algorithm operating to find a corrector that best satisfies these various constraints. This method is perfectly usable and suitable in the present context. Reference may be made for that purpose to D. Alazard et al., "Robustesse et commande optimale", CEPADUES, 1999.

However, we prefer describing here a method of RST corrector synthesis by robust pole placement, which has for advantage to offer the best simplicity-to-performance compromise.

In the following, we do not dwell on the calculation of block T(q) insofar as it does not affect the loop performances from the regulation point of view. This type of calculation is known and reference may be made for that purpose to the book I.D. Landau, "Commande des systèmes", Hermes, 2002.

Therefore, the corrector synthesis problem almost comes down to the synthesis of the polynomials R(q) and S(q) which are the unknowns of the problem.

These polynomials are obtained by solving a Bézout equation:

$$A(q)S(q) + B(q)R(q) = P(q) \qquad (9)$$

The polynomial P(q) which is the characteristic polynomial of the closed loop is the product of three monic polynomials such that $$P(q) = P_o(q)P_c(q)P_r(q)$$

$$\text{with: } d^o(P_o) = d^o(A) + 1, \, d^o(P_c) = d^o(B).$$

Moreover, fixed parts are imposed to S(q) and R(q) with:

$$S(q)=H_s(q)S'(q) \text{ and } R(q)=H_r(q)R'(q), \text{ with } d^o(H_r)=d^o(P_r).$$

In order to reject the static disturbances, an integral action is also imposed in the corrector, which amounts to take $H_s(q)=q-1$.

Moreover, the transfer operator $$\frac{H_r(q)}{P_r(q)}$$

is the series connection of second order resonant dipoles $$\frac{H_r(q)}{P_r(q)} = \frac{H_{r1}(q)}{P_{r1}(q)} \cdot \frac{H_{r2}(q)}{P_{r2}(q)} \cdots \frac{H_{rN_l}(q)}{P_{rN_l}(q)}$$

where $$\frac{H_{rk}(z)}{P_{rk}(z)}$$

is the transform in z of the continuous resonant dipole:

$$\frac{\dfrac{s^2}{(k\omega_r)^2} + 2\dfrac{\xi_{nk}}{(k\omega_r)} + 1}{\dfrac{s^2}{(k\omega_r)^2} + 2\dfrac{\xi_{dk}}{(k\omega_r)} + 1}$$

with $0 \leq \xi_{nk} < 1$, $0 < \xi_{dk} \leq 1$, preferably $\xi_{nk}$ is chosen equal to 0 or very close.

This method consisting in opening the loop at predetermined frequencies is described in the book of I.D. Landau, "Commande des systèmes", Hermes, 2002.

It can be noted that this method is a dual one to that consisting in rejecting harmonic disturbances at one or more given frequencies, which has been the subject of a patent application EP 2116912 entitled "Method and device for robust periodic disturbance rejection in an axis position loop". Nevertheless, the object of the present application is to make the corrector fully blind to sinusoidal disturbances, whereas, on the contrary, in patent EP 2116912, the corrector must react perfectly to these disturbances in order to fully compensate for them. And hence, the object of the present application is antagonist with respect to that of the application EP 2116912.

Moreover, the choice of the polynomials $P_o(q)$, $P_c(q)$ is preferably made by application of the so-called "ppa" and "ppb" methods and described in the book "Automatique appliquée", Hermes, 2009, by Philippe de Larminat. These functions have setting parameters to arbitrate the compromises inherent in the corrector synthesis.

The identification procedure will now be described.

As mentioned hereinabove, the torque undulations $d_m(t)$ whose expression is given in formula (2) appear through the sensitivity function $$S_{y_m d_m}(q) = \frac{G(q)}{1 + C(q)G(q)},$$

but thanks to the "loop opening" at the frequencies $k\omega_r$, $1 \leq k \leq N_l$, and which is obtained by a corrector synthesis configured for the speed at which rotates the axis, causing the forcing of $$\left| \frac{1}{1 + C(e^{i\omega})G(e^{i\omega})} \right|$$

to 1, at the frequencies $\omega_r$, $2\omega_r$ . . . we have robustly $S_{y_m d_c}(e^{i\omega})=G(e^{i\omega})$.

Now, it is known, as already mentioned, that for a rather wide range of axis rotation frequencies of precision rotary devices, such as motion simulators and centrifuges, the gain $$\left| G(e^{i\omega}) \right| = \left| \frac{B(e^{i\omega})}{A(e^{i\omega})} \right|$$

of the transfer function of the axes of these devices may be considered, in a rather wide frequency range, as being that of a dual integrator, that is to say with a decrease of 40 dB/decade, and the corresponding transfer function has in this frequency range a quasi-constant phase of −180°. On the other hand, at low rotation frequency, the gain of this transfer function deviates from this very simple model with a model slope that tends to decrease by only 20 dB/decade, due to the viscous frictions. Moreover, at high frequency, resonances and anti-resonances appear, which also change the decrease of the transfer function gain.

By way of example, FIG. 5 shows an example of Bode diagram of the transfer function $$G(z) = \frac{B(z)}{A(z)}$$

of such a device as well as the minimum frequencies $\omega_{low}$ and $\omega_{high}$ between which the transfer function of these devices has substantially the properties of that of a dual integrator.

Therefore, under the hypothesis that the fundamental frequency $k\omega_r$, $k \in \mathbb{N}$, $1 \leq k \leq N_l$ ($\omega_r$) and the harmonics of the torque undulations are in the range $[\omega_{low}, \omega_{high}]$, it may be considered that the torque undulation/"cogging" $d_m(t)$ affects $y(t)$ by the effect of a filtering of a dual integrator.

Let's call $y_T(t)$ the torque undulations/"cogging" effect to which is added the attached coder disturbance effect on the position measurement for constant speeds of rotation such as $\omega_{low} \leq k\omega_r \leq \omega_{high}$, $k \in \mathbb{N}$, $1 \leq k \leq N_l$, then the measured position can be modelled (assuming a constant or quasi-constant speed):

$$y_m(t) = y_T(t) + \bar{y}(t) + d''(t) \tag{10}$$

where $\bar{y}(t)$ would be the physical position of the motor if not disturbed by the torque undulations, and $d''(t)$ a term of centred disturbances and with:

$$y_T(t) \approx \sum_{k=1}^{N_l} \frac{\alpha'_k}{(k\omega_r)^2} \cos(y(t)) + \tag{11}$$
$$\frac{\beta'_k}{(k\omega_r)^2} \sin(y(t)) + \sum_{k=1}^{N} [a_k \cos(y(t)) + b_k \sin(y(t))]$$

It is hence seen that, at constant axis speed setpoint, there exists a linear relationship involving the coefficients $$a_k, b_k, a'_k, \beta'_k,$$

which may be written:

$$y_m(t) = \varphi(t)\theta + \bar{y}(t) + d''(t) \tag{12}$$

the term $d''(t)$ being a centred disturbance term and with:

$$\varphi(t) = \left[ \cos(y(t)) \; \sin(y(t)) \; \cos(2y(t)) \; \sin(2y(t)) \; \ldots \ldots \frac{1}{(\omega_r)^2} \cos(y(t)) \right.$$
$$\left. \frac{1}{(\omega_r)^2} \sin(y(t)) \; \frac{1}{(2\omega_r)^2} \cos(2y(t)) \; \frac{1}{(2\omega_r)^2} \sin(2y(t)) \; \ldots \right]$$

which is approximated by (due to the small deviation between $y_m(t)$ and $y(t)$ and to the quasi-constant nature of the axis speed):

$$\varphi(t) = \left[ \cos(y_m(t)) \; \sin(y_m(t)) \; \cos(2y_m(t)) \; \sin(2y_m(t)) \cdots \; \cdots \frac{1}{(\omega_r)^2} \right. \tag{13}$$
$$\left. \cos(y_m(t)) \; \frac{1}{(\omega_r)^2} \sin(y_m(t)) \; \frac{1}{(2\omega_r)^2} (2y_m(t)) \; \frac{1}{(2\omega_r)^2} \sin(2y_m(t)) \cdots \right]$$

and $$\theta^T = [a_1 \; b_1 \; a_2 \; b_2 \; \cdots \; \alpha'_1 \; \beta'_1 \; \alpha'_2 \; \beta'_2 \; \cdots] \tag{14}$$

which is a vector of parameters characterizing the coder errors and the torque undulations.

Moreover, a centred position measurement of $y_m(t)$ noted $$y'_m(t)$$

can be defined, with:

$$y'_m(t) = y_m(t) - y_c(t) - \frac{Te}{t_{max}} \sum_{t=0}^{t_{max}} (y_m(t) - y_c(t)) \tag{15}$$

where it is reminded that $y_c(t)$ is the position setpoint provided to the control and the right term is a mean of the deviations between $y_m(t)$ and $y_c(t)$, this subtraction having for object to ensure that $$y'_m(t)$$

is centred. Moreover, $t_{max}$ is the final time of the test, Te is the duration of each sampling period.

In which case, it may finally be written:

$$y'_m(t) = \varphi(t)\theta + d'''(t) \tag{16}$$

where $d'''(t)$ is a centred disturbance term.

For a single constant rotation speed, indexed j, $\omega_{rj}$, by concatenation, a matrix relationship may be written between the position measurement and a function of parameters characterizing the coder errors and the torque undulations:

$$Y_j = \phi_j \theta + D_j \tag{17}$$

$$\text{with } \phi_j = \begin{bmatrix} \varphi(0) \\ \varphi(1) \\ \vdots \\ \varphi(t_f) \end{bmatrix} \; Y_j = \begin{bmatrix} y'_m(0) \\ y'_m(1) \\ \vdots \\ y'_m(t_f) \end{bmatrix} \tag{18}$$

In a particular embodiment, the components of $\varphi(t)$ in the relationship (13) may be subjected to a filtering that may be high-pass or low-pass or band-pass. In such an embodiment, the components $$y'_m(t)$$

are then subjected to the same filtering.

All the harmonics are taken into account in the constitution of the vectors $\varphi(t)$ of formula (13) and $\theta$ of formula (14), but in alternative embodiments, certain intermediate harmonics may be omitted in the constitution of the vectors φ(t) and θ.

It can be observed that, due to the expression of φ(t) given in (13), the matrix $\phi_j$ is not full column rank. Which concretely means that the vector θ is not identifiable if only one test of the system is made at a single constant speed $\omega_{rj}$.

As a consequence, it is preferable to make multiple tests of the system at different constant speeds $\omega_{r1}$, $\omega_{r2}$, $\omega_{r3}$ . . . $\omega_{rn}$, the choice of the speeds being constraint by $\omega_{low} \leq k\omega_{rj} \leq \omega_{high}$ for $1 \leq k \leq N_l$, j being an integer belonging to [1 . . . n] and n being the number of tests at different constant speeds. Preferably, n>=2.

The number $N_l$ is preferably identical for the different constant speeds. For all the different constant speeds, the harmonic of maximum rank considered in the calculations may hence be lower than or equal to the maximum frequency $\omega_{high}$.

The test may possibly be repeated several times for a given constant speed but the tests must be repeated for several different constant speeds to obtain the identifiability. It is reminded that, in the case of the position setpoint example, this corresponds to ramp setpoints whose duration may be perfectly controlled by the user and allows a high number of rotations. Preferably, during the test, the measurements for the tests are started after a certain time after the start of the ramp to avoid measuring start-up transients and that the speed is stabilized, it is also possible to start from an already-established higher or lower speed rotation to reach the test speed of rotation, in order to reduce the speed stabilisation time.

By concatenation of the vectors Y; and the matrices p, after these multiple tests at different fundamental frequencies of rotation, a whole linear relationship is obtained:

$$Y = \phi\theta + D \qquad (19)$$

with:

$$Y = \begin{bmatrix} Y_1 \\ Y_2 \\ \vdots \\ Y_n \end{bmatrix} \phi = \begin{bmatrix} \phi_1 \\ \phi_2 \\ \vdots \\ \phi_n \end{bmatrix} \qquad (20)$$

Thereafter, the estimation of θ, called θ̂, is calculated using the least squares relationship according to the well-known formula:

$$\hat{\theta} = (\phi^T\phi)^{-1}\phi^T Y \qquad (21)$$

In practice, it is preferable to perform a certain number of tests at constant speed setpoint, and with more that two constant speeds in order to improve the identifiability of the parameters and reduce the uncertainties on θ̂.

The interest of the method is that the number of tests at constant speed can be multiplied (the tests can be repeated at a same frequency, hence with a same position setpoint ramp and/or different speeds, hence with different position setpoint ramps), and it is also possible to make these tests last as long as desired, in order to increase significantly the information available and to hence reduce the uncertainties on the estimated parameters.

Once the vector θ̂ has been estimated, a coder error compensation calculation block can hence be elaborated, whose input is $y_m(t)$ and whose output is a compensated position $y_{mc}(t)$, with the relationship $$y_{mc}(t) = -\sum_{k=1}^{N} a_k\cos(y_m(t)) + b_k\sin(y_m(t)) \qquad (22)$$

and $y_{mc}(t)$ being the compensated position measurement signal, which is injected upstream from the corrector C(q) for subtraction from $y_c(t)$, such as in the system shown in FIG. 6.

The compensation may be implemented directly, with calculations in real time, from the analytic formula (22), or from compensation tables, previously obtained with the method of the invention, on a mesh of angular positions with preferentially interpolation between the mesh points, the latter solution limiting the calculations to searches in the compensation tables and preferably to interpolations.

It is important to note once again that the "opening of the system loop" at certain frequencies is not a physical/material operation because the system remains always looped/controlled during the tests, but is the result of a calculation method making it possible to estimate parameters obtained from the vector θ̂. To obtain this immaterial "opening" of the looped system at certain frequencies, during the tests, the system is placed in a range of speeds of rotation of the rotation actuator in which it acts as a dual integrator, that is to say that the curve of the transfer function gain of the actuator has a decrease of substantially 40 dB/decade, which "opens" the system, and tests of the system are performed at several constant speeds of rotation in this range.

A second embodiment in which the compensation table to be used in the system of FIG. 6 is now determined by iteration will now be described. This second embodiment consists in iterating the test and the above-described calculation of θ̂, using the results of the preceding iterations.

For that purpose, a first estimated vector $\hat{\theta}_1$ is calculated by the procedure described hereinabove, after which the first compensation obtained by this first calculation is introduced into the system and a second series of tests is made, always at constant speeds, with the system including the first compensation. A second estimated vector $\hat{\theta}_2$ is then obtained by calculation, and a compensation which is established on the vector $\hat{\theta}_1+\hat{\theta}_2$ is introduced into the system for potential other tests or for the use of the system in metrology, for example. This iterative procedure of tests and calculations of estimated vector $\hat{\theta}_3$, $\hat{\theta}_4$ . . . can be continued, making it possible to establish vectors $\hat{\theta}_1+\hat{\theta}_2+\hat{\theta}_3$ . . . for the compensation calculation block. The iteration may be stopped after a determined number of iterations or a stop criterion may be set, based on the value of the vector estimated during the current iteration, the later having converging values.

It is understood that, within the framework of this iteration method, the previous determination of the range [$\omega_{low}$, $\omega_{high}$] is performed only once and does not need to be repeated at each iteration of the phases of tests and calculation of the parameters characterizing the coder errors and the torque undulations by solving the whole matrix relationship.

A description will now be made of an alternative embodiment of calculation of the estimation of θ, called θ̂, which does not use the least squares formula but uses a regularisation method that consists in determining θ̂ using the following calculation:

$$\hat{\theta} = \left(\phi^T\phi + H\right)^{-1}\phi^T Y \qquad (23)$$

where H is a square matrix defined positive of the size of $\phi^T\phi$. This way to proceed has for drawback to add bias to the estimates $\hat{\theta}$, but, in certain cases, it may contribute to reduce the variance of the coefficients of $\hat{\theta}$ and hence the uncertainties in the position compensation.

In another alternative, the corrector synthesis method making it possible to "open the loop" at the frequencies of interest may be carried out differently than the pole placement method developed hereinabove. In particular, a H-infinity control can be implemented.

In a particular embodiment of the invention, the vector $\theta$ can be determined according to the procedure described hereinabove and using coder position error measurements obtained by an optical measurement method and in such a way that these optical measurements made over a finite number of positions is hybridized with the data collected and gathered in the vector Y. This optical method of coder position error measurement uses interferometry and can hence be very accurate.

Under the hypothesis that $n_p$ measurements of coder error $e_i$ for $i \in [1, \ldots n_p]$ have been made by means of the optical measurement method, here for $n_p$ positions of the axis denoted $$E_c = \begin{bmatrix} e_1 \\ e_2 \\ \vdots \\ e_{n_p} \end{bmatrix}.$$

these measured errors can be gathered in a vector $$y_i^*, i \in [1, \ldots n_p],$$

A matrix C of size $(n_p, 2(N_l+N))$ may be constructed, in such a way that $$C = \begin{bmatrix} \cos(y_1^*) & \sin(y_1^*) & \cdots & \cos(Ny_1^*) & \sin(Ny_1^*) & 0_{1,N_l} \\ \vdots & \vdots & \vdots & \vdots & \vdots & \vdots \\ \cos(y_{n_p}^*) & \sin(y_{n_p}^*) & \cdots & \cos\left(Ny_{n_p}^*\right) & \cos\left(Ny_{n_p}^*\right) & 0_{1,N_l} \end{bmatrix}$$

It is reminded that $N_l$ is the maximum rank of the harmonics modelling the torque undulations and N the maximum harmonic rank of a decomposition into Fourier series of the coder errors (see equations 1, 2, 7 and 22).

In C, $0_{1,N_l}$ is a matrix of one row and $N_l$ columns.

As the uncertainties on the optical measurements can be made very small, they can be neglected, in which case, the following equality is valid: $E_c = C\theta$.

The estimation of $\theta$ is then a problem of minimization of a quadratic criterion $$J = (Y - \phi\theta)^T (Y - \phi\theta)$$

under the following equality constraint:

$$E_c = C\theta$$

The solution of this problem is classical in numerical analysis (using the Lagrangian). The interest of this method being to guarantee that the estimate of the coder error due to the procedure coincide perfectly with the optical measurement at a finite number of points.

Finally, it is understood that the invention can also be applied to linear/translation actuators in the case where said actuator comprises a controlled rotary member and a rotation sensor and that the rotation motion is converted into a translation motion.

The invention claimed is:

1. A method for estimating angular errors of angle coders in a looped system including at least one actuator for rotating an axis and an angle coder providing a signal of position measurement of said axis, and including a calculation device for at least controlling said actuator, wherein the calculation device receives a setpoint signal at the system input, and the signal of position measurement for looping the system, the rotation actuator generating torque undulations $d_m(t)$, the coder producing coder errors $d_c(t)$ which, for a setpoint signal $y_c(t)$ that corresponds to a rotation of the axis at a speed of rotation $\omega_r$ assumed to be constant, have a spectrum consisting of the fundamental rotation frequency of value $\omega_r$ and its harmonics $k\omega_r$, $k \in \mathbb{N}$, the speed of rotation and the rotation frequency having a same unit, and wherein the calculating device calculates a command signal in a corrector, wherein, in a test phase, for a speed of rotation indexed j, $\omega_{rj}$, assumed to be constant, a specific corrector $C_{\omega_{rj}}(q)$ of said constant speed of rotation $\omega_{ri}$ is synthesized, said corrector $C_{\omega_{rj}}(q)$ being such that, for the frequency domain comprising the fundamental rotation frequency of value $\omega_{rj}$ and a determined number of its first harmonics $k\omega_{rj}$, $k \in \mathbb{N}$, $1 < k \le N_l$, $N_l$ being the maximum rank of the harmonics to be considered, the corrector has a zero gain at these frequencies $\omega_{ri}$, $k\omega_{ri}$, which causes an opening of the loop at said frequencies, and a matrix relationship is established between the position measurements and a function of parameters characterizing the coder errors and the torque undulations, on the system with the specific corrector and at the constant speed of rotation $\omega_{rj}$, wherein the test phase is repeated a determined number n of times with different setpoints of rotation at speed of rotation $\omega_{ri}$ each assumed to be constant, where, $j \in \mathbb{N}$, $1 < j \le n$, wherein the matrix relationships of the repeated test phases are concatenated in order to obtain an identifiable global matrix relationship, and wherein the parameters characterizing the coder errors and the torque undulations are estimated by solving the global matrix relationship, the corrector being synthesized either by a mixed-sensitivity method on an H-infinity control, or by a robust pole placement method on RST corrector.

2. The method according to claim 1, wherein, moreover, once estimated the parameters characterizing the coder errors and the torque undulations, the calculation device is configured for the execution in real time of the calculation of a coder error compensation signal in order to compensate for the coder errors.

3. The method according to claim 1, wherein a range $[\omega_{low}, \omega_{high}]$ of rotation frequency of the actuator in which an axis transfer function module has a decrease of 40 dB/decade is previously determined, and in the test phase, the different speeds of rotation $\omega_{rj}$ are further chosen in such a way that each constant speed of rotation $\omega_{ri}$ and its $N_l$ harmonics $k\omega_{ri}$ are in the range $[\omega_{low}, \omega_{high}]$.

4. The method according to claim 3, wherein the range $[\omega_{low}, \omega_{high}]$ of rotation frequency of the actuator in which the axis transfer function has a decrease of 40 dB/decade is determined by a method chosen among:

a graphical method using the curve of the gain $$G\!\left(e^{i\omega}\right) = \left|\frac{B\!\left(e^{i\omega}\right)}{A\!\left(e^{i\omega}\right)}\right|$$

of the axis transfer function and determining a lower limit $\omega_{low}$ and an upper limit $\omega_{high}$ of frequencies surrounding an area of the curve having a decrease of 40 dB/decade, B being an output function and A being an input function, and an identification method.

5. The method according to claim 1, wherein, in the test phase, the setpoint signal $y_c(t)$ at the system input is a ramp position setpoint signal or a constant speed of rotation setpoint signal.

6. The method according to claim 1, wherein the matrix relationship between the position measurements and a function of parameters characterizing the coder errors and the torque undulations is expressed by:

$$Y_j = \phi_j \theta + D_j$$

$$\text{with } \phi_j = \begin{bmatrix} \varphi(0) \\ \varphi(1) \\ \vdots \\ \varphi(t_f) \end{bmatrix} \quad Y_j = \begin{bmatrix} y'_m(0) \\ y'_m(1) \\ \vdots \\ y'_m(t_f) \end{bmatrix}$$

where $Y_j$ is a vector of centered position measurement of coefficients $$y'_m(t),$$

and $$\varphi(t) = \left[\cos(y_m(t))\ \sin(y_m(t))\ \cos(2y_m(t))\ \sin(2y_m(t))\cdots\ \cdots\frac{1}{(\omega_r)^2}\right.$$
$$\left.\cos(y_m(t))\ \frac{1}{(\omega_r)^2}\sin(y_m(t))\ \frac{1}{(2\omega_r)^2}(2y_m(t))\ \frac{1}{(2\omega_r)^2}\sin(2y_m(t))\cdots\right]$$
$$\text{and } \theta^T = [a_1\ b_1\ a_2\ b_2\ \cdots\ \alpha'_1\ \beta'_1\ \alpha'_2\ \beta'_2\ \cdots]$$

a transposed vector of the parameters characterizing the coder errors and the torque undulations, $y_m(t)$ is the signal of position measurement provided by the angle coder, and $D_j$ a vector of centered disturbance terms.

7. The method according to claim 6, wherein the components $\varphi(t)$ of $\phi_i$ and the components $$y'_m(t)$$

of $Y_j$ are filtered, wherein the filtering can be high-pass or low-pass or band-pass.

8. The method according to claim 7, wherein the identifiable global matrix relationship $$Y = \phi\theta + D$$

with:

$$Y = \begin{bmatrix} Y_1 \\ Y_2 \\ \vdots \\ Y_n \end{bmatrix} \quad \phi = \begin{bmatrix} \phi_1 \\ \phi_2 \\ \vdots \\ \phi_n \end{bmatrix}$$

is used to produce an estimation $\hat{\theta}$ of the parameters characterizing the coder errors and the torque undulations by linear regression and application of a least squares relationship according to $\hat{\theta} = (\phi^T\phi)^{-1}\phi^T Y$.

9. The method according to claim 7, wherein the identifiable global matrix relationship $$Y = \phi\theta + D$$

with:

$$Y = \begin{bmatrix} Y_1 \\ Y_2 \\ \vdots \\ Y_n \end{bmatrix} \quad \phi = \begin{bmatrix} \phi_1 \\ \phi_2 \\ \vdots \\ \phi_n \end{bmatrix}$$

is used to produce an estimation $\hat{\theta}$ of the parameters characterizing the coder errors and the torque undulations and with a regularization method using the following relationship:

$$\hat{\theta} = (\phi^T\phi + H)^{-1}\phi^T Y$$

where H is a square matrix defined as positive and of the size of $\phi^T\phi$.

10. The method according to claim 7, wherein an interferometric optical measurement method is implemented for measuring the coder errors, said measurements being made on a finite number $u_p$ of positions of the axis, and wherein the estimation $\hat{\theta}$ of the parameters characterizing the coder errors and the torque undulations is obtained by minimizing a quadratic criterion $j = (Y - \phi\theta)^T(Y - \phi\theta)$ under the equality constraint $E_c = C\theta$, where C is a matrix such that $$C = \begin{bmatrix} \cos(y_1^*) & \sin(y_1^*) & \cdots & \cos(Ny_1^*) & \sin(Ny_1^*) & 0_{1,N_l} \\ \vdots & \vdots & \vdots & \vdots & \vdots & \vdots \\ \cos(y_{n_p}^*) & \sin(y_{n_p}^*) & \cdots & \cos(Ny_{n_p}^*) & \cos(Ny_{n_p}^*) & 0_{1,N_l} \end{bmatrix}$$

$$y_i^*$$

corresponding to the $n_p$ measurement positions on the axis, $i \in [1, \ldots n_p]$, and N being the maximum harmonic rank of a Fourier series decomposition of the coder errors.

11. The method according to claim 6, wherein the identifiable global matrix relationship $$Y = \phi\theta + D$$

with:

$$Y = \begin{bmatrix} Y_1 \\ Y_2 \\ \vdots \\ Y_n \end{bmatrix} \quad \phi = \begin{bmatrix} \phi_1 \\ \phi_2 \\ \vdots \\ \phi_n \end{bmatrix}$$

is used produce an estimation $\hat{\theta}$ of the parameters characterizing the coder errors and the torque undulations by linear regression and application of a least squares relationship according to $\hat{\theta}=(\phi^T\phi)^{-1}\phi^T Y$.

12. The method according to claim 11, wherein the calculation device is implemented, which is configured for the execution in real time, in a compensation calculation block, of the calculation of a coder error compensation signal in order to compensate for the coder errors, and the calculation device is configured to take into account in real time the torque undulations, and wherein the estimation $\hat{\theta}$ of the vector $\theta$ of the parameters characterizing the coder errors and the torque undulations is calculated by iteration: after a first repetition of test phases and a first calculation of the parameters characterizing the coder errors and the torque undulations by solving the global matrix relationship, a first estimated vector $\hat{\theta}_1$ is estimated, the coder error compensation signal being then calculated and the torque undulations being then taken into account on the basis of said first estimated vector $\hat{\theta}_1$, a new repetition of test phases and a new calculation of the parameters characterizing the coder errors and the torque undulations by solving the global matrix relationship are performed on the system so-compensated on the basis of the first estimated vector $\hat{\theta}_1$, a new estimated vector $\hat{\theta}_2$ being estimated, the coder error compensation signal being then calculated and the torque undulations being then taken into account on the basis of the sum of the previous estimated vector $\hat{\theta}_1$ and the new estimated vector $\hat{\theta}_2$, and subsequent iterations are performed on the compensated system on the basis of the sum of the previous estimated vectors $\hat{\theta}_1+\hat{\theta}_2+\hat{\theta}_3$ . . . .

13. The method according to claim 6, wherein the identifiable global matrix relationship $$Y=\phi\theta+D$$

with:

$$Y = \begin{bmatrix} Y_1 \\ Y_2 \\ \vdots \\ Y_n \end{bmatrix} \quad \phi = \begin{bmatrix} \phi_1 \\ \phi_2 \\ \vdots \\ \phi_n \end{bmatrix}$$

is used to produce an estimation $\hat{\theta}$ of the parameters characterizing the coder errors and the torque undulations and with a regularization method using the following relationship:

$$\hat{\theta}=(\phi^T\phi+H)^{-1}\phi^T Y$$

where H is a square matrix defined as positive and of the size of $\phi^T\phi$.

14. The method according to claim 13, wherein the calculation device is implemented, which is configured for the execution in real time, in a compensation calculation block, of the calculation of a coder error compensation signal in order to compensate for the coder errors, and the calculation device is configured to take into account in real time the torque undulations, and wherein the estimation $\hat{\theta}$ of the vector $\theta$ of the parameters characterizing the coder errors and the torque undulations is calculated by iteration: after a first repetition of test phases and a first calculation of the parameters characterizing the coder errors and the torque undulations by solving the global matrix relationship, a first estimated vector $\hat{\theta}_1$ is estimated, the coder error compensation signal being then calculated and the torque undulations being then taken into account on the basis of said first estimated vector $\hat{\theta}_1$, a new repetition of test phases and a new calculation of the parameters characterizing the coder errors and the torque undulations by solving the global matrix relationship are performed on the system so-compensated on the basis of the first estimated vector $\hat{\theta}_1$, a new estimated vector $\hat{\theta}_2$ being estimated, the coder error compensation signal being then calculated and the torque undulations being then taken into account on the basis of the sum of the previous estimated vector $\hat{\theta}_1$ and the new estimated vector $\hat{\theta}_2$, and subsequent iterations are performed on the compensated system on the basis of the sum of the previous estimated vectors $\hat{\theta}_1+\hat{\theta}_2+\hat{\theta}_3$ . . . .

15. The method according to claim 6, wherein an interferometric optical measurement method is implemented for measuring the coder errors, said measurements being made on a finite number $n_p$ of positions of the axis, and wherein the estimation $\hat{\theta}$ of the parameters characterizing the coder errors and the torque undulations is obtained by minimizing a quadratic criterion $I=(Y-\phi\theta)^T(Y-\phi\theta)$ under the equality constraint $E_c=C\theta$, where C is a matrix such that $$C = \begin{bmatrix} \cos(y_1^*) & \sin(y_1^*) & \cdots & \cos(Ny_1^*) & \sin(Ny_1^*) & 0_{1,N_l} \\ \vdots & \vdots & \vdots & \vdots & \vdots & \vdots \\ \cos(y_{n_p}^*) & \sin(y_{n_p}^*) & \cdots & \cos\left(Ny_{n_p}^*\right) & \cos\left(Ny_{n_p}^*\right) & 0_{1,N_l} \end{bmatrix}$$

$$y_i^*$$

corresponding to the $n_p$ measurement positions on the axis, $i \in [1, \ldots n_p]$,
    and N being the maximum harmonic rank of a Fourier series decomposition of the coder errors.

16. The method according to claim 15, wherein the calculation device is implemented, which is configured for the execution in real time, in a compensation calculation block, of the calculation of a coder error compensation signal in order to compensate for the coder errors, and the calculation device is configured to take into account in real time the torque undulations, and wherein the estimation $\hat{\theta}$ of the vector $\theta$ of the parameters characterizing the coder errors and the torque undulations is calculated by iteration: after a first repetition of test phases and a first calculation of the parameters characterizing the coder errors and the torque undulations by solving the global matrix relationship, a first estimated vector $\hat{\theta}_1$ is estimated, the coder error compensation signal being then calculated and the torque undulations being then taken into account on the basis of said first estimated vector $\hat{\theta}_1$, a new repetition of test phases and a new calculation of the parameters characterizing the coder errors and the torque undulations by solving the global matrix relationship are performed on the system so-compensated on the basis of the first estimated vector $\hat{\theta}_1$, a new estimated vector $\hat{\theta}_2$ being estimated, the coder error compensation signal being then calculated and the torque undulations being then taken into account on the basis of the sum of the previous estimated vector $\hat{\theta}_1$ and the new estimated vector $\hat{\theta}_2$, and subsequent iterations are performed on the compensated system on the basis of the sum of the previous estimated vectors $\hat{\theta}_1 + \hat{\theta}_2 + \hat{\theta}_3 \ldots$ .

17. The method according to claim 1, wherein the number $N_i$ of harmonics $k\omega_{ri}$ is identical for the n tests with rotation setpoints at different speeds of rotation $\omega_{ri}$.

18. The method according to claim 1, wherein certain harmonics $k\omega_{ri}$ are omitted for the estimation of the parameters characterizing the coder errors and the torque undulations.

19. A device having at least one rotary axis, said device being a motion simulator or a centrifuge and including the looped system configured to execute the method according to claim 1 and including the at least one actuator for rotating the axis and the angle coder producing the signal of position measurement of said axis, and including the calculation device for at least controlling said actuator, the looped system is configured in that the calculation device receives the setpoint signal at the system input, and the signal of position measurement for looping the system, the rotation actuator generating torque undulations $d_m(t)$, the coder producing coder errors $d_c(t)$ which, for the setpoint signal $y_c(t)$ that corresponds to the rotation of the axis at a speed of rotation $\omega_r$ assumed to be constant, have the spectrum consisted of the fundamental rotation frequency of value $\omega_r$ and its harmonics $k\omega_r$, $k \in \mathbb{N}$, the speed of rotation and the rotation frequency having a same unit, the calculation device of the looped system being configured to calculate the command signal in the corrector, wherein the device is configured for:

in a test phase, for a speed of rotation indexed j, $\omega_{rj}$, assumed to be constant, a specific corrector $C_{\omega rj}(q)$ of said constant speed of rotation $\omega_{rj}$ is synthesized, said corrector $C_{\omega rj}(g)$ being such that, for the frequency domain comprising the fundamental rotation frequency of value $\omega_{rj}$ and a determined number of its first harmonics $k\omega_{rj}$, $k \in \mathbb{N}$, $1 < k \le N_j$, $N_j$ being the maximum rank of the harmonics to be considered, the corrector having a zero gain at these frequencies $\omega_{rj}$, $k\omega_{rj}$, which causes an opening of the loop at said frequencies, and a matrix relationship is established between the position measurements and a function of parameters characterizing the coder errors and the torque undulations, on the system with the specific corrector and at the constant speed of rotation $\omega_{rj}$, the test phase is repeated a determined number n of times with different setpoints of rotation at speed of rotation $\omega_{rj}$ assumed to be constant, where, $j \in \mathbb{N}$, $1 < j \le n$, the matrix relationships are concatenated in order to obtain an identifiable global matrix relationship, the parameters characterizing the coder errors and the torque undulations are estimated by solving the global matrix relationship.

* * * * *